US012605669B2

(12) United States Patent (10) Patent No.: US 12,605,669 B2

Muske et al. (45) Date of Patent: Apr. 21, 2026

(54) SYSTEMS AND METHODS FOR PNEUMATIC CLEANING OF AN EXTRACTION SYSTEM FILTER

(71) Applicant: ILLINOIS TOOL WORKS INC., Glenview, IL (US)

(72) Inventors: Mitchell James Muske, Neenah, WI (US); Allan T. Hilbert, Appleton, WI (US); Jeremy Bruesewitz, Appleton, WI (US); William Gardner, Appleton, WI (US); Joseph C. Schneider, Greenville, WI (US)

(73) Assignee: ILLINOIS TOOL WORKS INC.

( * ) Notice: Subject to any disclaimer, the term of this patent is extended or adjusted under 35 U.S.C. 154(b) by 0 days.

(21) Appl. No.: 17/668,817

(22) Filed: Feb. 10, 2022

(65) Prior Publication Data

US 2022/0258092 A1     Aug. 18, 2022

Related U.S. Application Data

(60) Provisional application No. 63/149,875, filed on Feb. 16, 2021.

(51) Int. Cl.
    *B01D 46/00* (2022.01)
    *B01D 35/16* (2006.01)
    *B01D 46/04* (2006.01)
    *B01D 46/71* (2022.01)

(52) U.S. Cl.
    CPC ............. *B01D 46/71* (2022.01); *B01D 35/16* (2013.01); *B01D 46/04* (2013.01)

(58) Field of Classification Search
    CPC ........ B01D 35/16; B01D 46/71; B01D 46/04; B01D 46/10
    USPC ..................................................... 55/282–305
    See application file for complete search history.

(56) References Cited

U.S. PATENT DOCUMENTS

| | | | | |
|---|---|---|---|---|
| 4,491,458 A | * | 1/1985 | Sunter ................ | B01D 46/0086 |
| | | | | 55/284 |
| 4,538,361 A | * | 9/1985 | Gresens ................ | F26B 25/007 |
| | | | | 34/636 |
| 4,859,335 A | * | 8/1989 | Whyte ................. | B01D 29/114 |
| | | | | 210/411 |

(Continued)

OTHER PUBLICATIONS

European Office Communication Appln No. 22157076.5 dated Jul. 21, 2023.

(Continued)

*Primary Examiner* — T. Bennett Mckenzie

(74) *Attorney, Agent, or Firm* — MCANDREWS HELD & MALLOY, LTD.

(57) ABSTRACT

An extraction system is designed for metal working and other applications. The system employs a pneumatic filter cleaning device with a pneumatically driven extension guide arranged within a chamber. The guide is coupled to a first end of an extension member, which has a nozzle secured to a second end. Pressurized air provided to the nozzle through the extension member increases until a pressure at the nozzle reaches a threshold pressure level. Once the threshold pressure level is achieved, the nozzle releases a pulse or burst of air directed to a filter medium. The force from the pulsed air dislodges airborne components from the filter media, resulting in a cleaned filter.

17 Claims, 5 Drawing Sheets

(56)                     References Cited

U.S. PATENT DOCUMENTS

| | | | | |
|---|---|---|---|---|
| 5,002,594 A | * | 3/1991 | Merritt .................. | B01D 46/90 |
| | | | | 55/294 |
| 5,182,832 A | * | 2/1993 | McMahon ............ | B01D 46/70 |
| | | | | 15/304 |
| 5,217,175 A | * | 6/1993 | Stitz ..................... | B65H 54/543 |
| | | | | 242/597.3 |
| 5,228,993 A | * | 7/1993 | Drori .................. | B01D 29/684 |
| | | | | 55/294 |
| 5,584,900 A | * | 12/1996 | Zaiser ................... | B01D 46/24 |
| | | | | 55/303 |
| 5,948,127 A | * | 9/1999 | Minakawa ............ | B01D 46/58 |
| | | | | 55/284 |
| 6,322,618 B1 | | 11/2001 | Simms | |
| 2004/0033149 A1 | * | 2/2004 | Kim ....................... | F04B 9/047 |
| | | | | 417/555.1 |
| 2007/0107391 A1 | | 5/2007 | Reining | |
| 2010/0083987 A1 | | 4/2010 | Reining | |
| 2011/0000506 A1 | * | 1/2011 | Martin .................. | B01D 41/04 |
| | | | | 134/198 |
| 2020/0406182 A1 | * | 12/2020 | Grieve .................. | B01D 46/71 |

OTHER PUBLICATIONS

European Office Communication Appln No. 22157076.5 dated Aug. 22, 2022.
European Office Communication with extended European Search Report Appln No. 22157076.5 dated Jun. 13, 2022.
European Examination Report Appln No. 22157076.5 dated Jan. 17, 2024.

\* cited by examiner

SYSTEMS AND METHODS FOR PNEUMATIC CLEANING OF AN EXTRACTION SYSTEM FILTER

CROSS-REFERENCE TO RELATED APPLICATIONS

This application hereby claims priority to and the benefit of U.S. Provisional Application Ser. No. 63/149,875, entitled "Systems And Methods For Pneumatic Cleaning Of An Extraction System Filter," filed Feb. 16, 2021. U.S. Provisional Application Ser. No. 63/149,875 is hereby incorporated by reference in its entireties for all purposes.

BACKGROUND

A wide range of industrial, commercial, hobby and other applications result in airborne components that can be removed with proper extraction and filtering. Metal working operations, for example, range from cutting, welding, soldering, assembly, and other processes that may generate smoke and fumes. In smaller shops it may be convenient simply to open ambient air passages or to use suction or discharge air from fans to maintain air spaces relatively clear. In other applications, enclosed and/or cart-type fume extraction systems are used. In industrial settings, more complex fixed systems may be employed for extracting fumes from specific works cells, metal working locations, and so forth. In other settings, such as machine shops, woodworking shops, worksites where cutting, sanding and other operations are performed, dust, fumes, particulate and other types of airborne components may be generated that it may be desirable to collect and extract from work areas and controlled spaces.

A number of systems have been developed for fume extraction, and a certain number of these are currently in use. In general, these use suction air to draw fumes and smoke from the immediate vicinity of the metal working operation, and to filter the fumes and smoke before returning the air to the room or blowing the air to an outside space.

Further improvements are needed, however, in fume extraction systems. For example, it would be useful to be able to clean and/or remove filter elements in such systems, thereby extending the useful life of the filter and/or extraction system, and/or improving performance of the extraction system.

SUMMARY

The present disclosure provides improvements to extractors designed. The disclosed pneumatically driven filter cleaning system is powered by compressed air, released in pulses from a nozzle or other diffuser. The device is configured to index the nozzle directed at various positions of a surface of the filter media, where changes in position are driven in response to changes in pressure at the nozzle. These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

The figures are not necessarily to scale. Where appropriate, similar or identical reference numbers are used to refer to similar or identical components.

DETAILED DESCRIPTION

Figure 1:
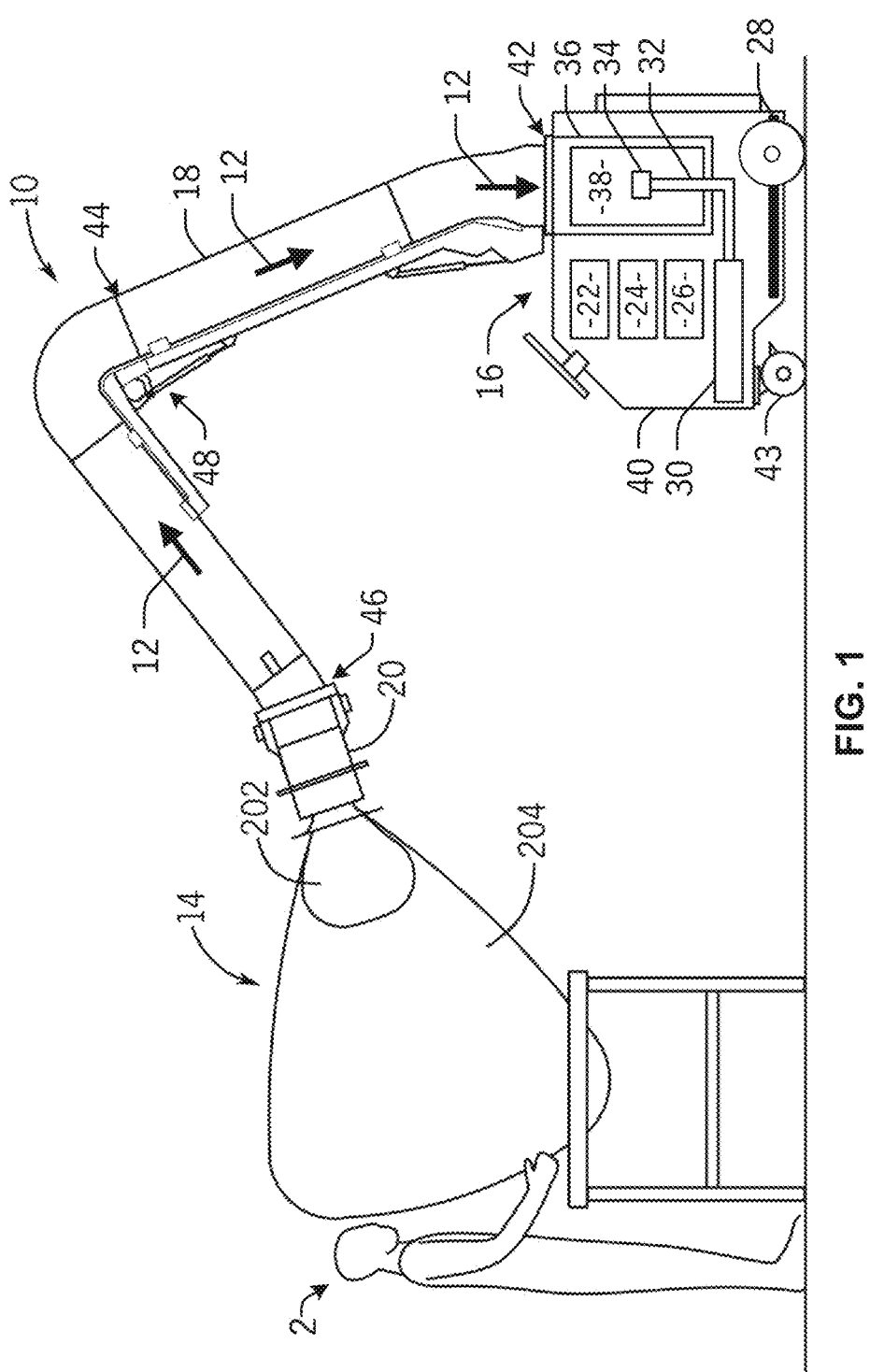
FIG. 1 illustrates an example fume extractor that includes a pneumatic cleaning system, in accordance with aspects of this disclosure.

Disclosed are systems and methods for pneumatic filter cleaning for use in an airborne extractor system. In particular, a pneumatically driven guide (e.g., extension guide) is arranged within a chamber or housing. The guide is coupled to a first end of a conduit (e.g., an extension member), which has a nozzle secured to a second end. Pressurized air provided to the nozzle through the conduit (such as a pipe or other conduit) increases until a pressure at the nozzle reaches a threshold pressure level. Once the threshold pressure level is achieved, the nozzle releases a pulse or burst of air directed to a filter medium. The force from the pulsed air dislodges airborne components from the filter media, which are collected and/or removed from the airborne extractor system, resulting in a cleaned filter, thereby improving the efficiency and extending the life of the filter and the system.

In some examples, the guide is configured as a cam with a groove, joint, or slot incorporated on a surface of the guide (e.g., etched, drilled, or otherwise integrally formed). A pin or other follower is arranged on an interior wall of the chamber opposite the surface of the guide, configured to allow movement of the guide based on the path of the groove. In particular, as the pressure at the nozzle increases, the guide is forced outward (e.g., to extend away from the compressed air source). The movement of the guide is partially controlled by the cam and follower, such that the outward movement is paired with rotational movement driven by a pattern of the groove.

In some examples, a spring or other device is used to bias the nozzle, conduit, and/or guide toward the compressed air source and/or into the chamber. The pressure at the nozzle increases sufficiently to overwhelm the biasing force to extend the nozzle to a first position. Once the pressure at the nozzle reaches a threshold pressure level, the air is released in a pulse. Upon release of the pulse (or pulses), the pressure at the nozzle decreases, resulting in the nozzle, conduit, and/or guide returning to a second position toward the compressed air source and/or into the chamber. The movement from the first to the second position can be rapid, causing a substantial impact, the force from which may serve to further dislodge debris or other contaminants from the filter media.

In some examples, the extension and/or return movement can be regulated (e.g., by one or more of the grooves, a series of bumpers, a pneumatic buffer, etc.) to cause vibrations in the system to dislodge contaminants from the filter media.

In disclosed examples, the pneumatically driven filter cleaning device is powered by compressed air, released in pulses from a nozzle or other diffuser. The device is configured to index the nozzle directed at various positions of a surface of the filter media, changes in position being driven in response to changes in pressure at the nozzle. For example, the changes follow a ratcheting motion guided by a cam and follower (or other guiding mechanism).

A filter cleaning operation may be controlled by a computing platform or control circuitry, such as in response to a monitored condition (e.g., via one or more sensors). Sensor data of the monitored conditions may be used to determine when filter replacement is needed, and provide an alert to an operator.

Advantageously, the disclosed pneumatic device employs an air ratcheting mechanism. The mechanism may operate on pressurized air provided via an air compressor without the use of a mechanical motor, as is employed in conventional systems.

In disclosed examples, a pneumatic filter cleaning device for an airborne extractor system includes a nozzle secured to a first end of a conduit; and a chamber enclosing a movable guide coupled to a second end of the conduit, wherein the nozzle is configured to release a pulse of air when a pressure at the chamber or the nozzle reaches a threshold pressure level.

In some examples, the guide is configured to move to a first position as a pressure at the nozzle increases to the threshold pressure level, the first position corresponding to a first distance of the nozzle extending from the chamber. In examples, the guide is configured to move to a second position corresponding to a second distance of the nozzle from the chamber following release of the pulse of air, the second distance being less than the first distance.

In some examples, the guide comprises a cam having a groove paired with a follower secured to an opposing surface of the chamber. In examples, the groove is configured to guide rotation of the guide as a change in pressure at the nozzle forces the nozzle to move from the first position to the second position, movement of the nozzle causing movement of the movable guide. In examples, the cam is configured to force extension of the conduit to the first position at a first rate of movement in response to an increase in pressure at the nozzle, and to force retraction of the conduit to the second position at a second rate of movement greater than the first rate in response to the pulse of air.

In some examples, a spring is configured to bias the nozzle toward the second position. In some examples, a bumper within the chamber is configured to limit movement of the conduit.

In some examples, pressurized air is provided by an air compressor connected to the chamber. In examples, conveyance of the pressurized air from the air compressor is regulated by a valve.

In some examples, the nozzle is oriented toward a surface of a filter element. In some examples, the nozzle is a first nozzle arranged at a first position on the conduit, the device further comprising a second nozzle arranged at a second position on the conduit.

In some disclosed examples, a pneumatic filter cleaning device for an airborne extractor system includes a nozzle secured to a first end of a conduit; and a chamber enclosing a movable guide coupled to a second end of the conduit, wherein the nozzle is configured to release a pulse of air when a pressure at the nozzle reaches a threshold pressure level; and a valve configured to convey pressurized air into the filter cleaning device in response to a control signal from control circuitry.

In some examples, control circuitry is configured to monitor one or more operating conditions of a filter media; determine a value of the one or more operating conditions; and compare the value to a list of threshold operating condition values.

In some examples, the control circuitry is configured to control the valve to open to convey pressurized air in response to the value exceeding a first threshold operating condition value of the list of threshold operating condition values.

In some examples, the control circuitry is configured to generate an alert in response to the value exceeding a second threshold operating condition value of the list of threshold operating condition values.

In some examples, the one or more operating conditions comprises a static pressure, a change in pressure, an air flow rate, a change in air flow rate, a charge, an amount of detritus collected at the filter element, or a time of filter use.

In some disclosed examples, a pneumatic filter cleaning device for an airborne extractor system includes a nozzle secured to a first end of a conduit; and a chamber configured to receive pressurized air and coupled to a second end of the conduit, wherein the nozzle is configured to release a pulse of air when a pressure at the chamber or the nozzle reaches a threshold pressure level.

In some examples, a guide is configured to regulate rotation of the nozzle, wherein a change in pressure at the chamber or the nozzle forces the nozzle to release the pulse of air thereby rotating the nozzle from a first position to a second position. In examples, the guide is a bushing configured to slow or interrupt rotation of the nozzle from the first position to the second position.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the terms "first" and "second" may be used to enumerate different components or elements of the same type, and do not necessarily imply any particular order.

As used herein the terms "circuits" and "circuitry" refer to any analog and/or digital components, power and/or control elements, such as a microprocessor, digital signal processor (DSP), software, and the like, discrete and/or integrated components, or portions and/or combinations thereof, including physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller.

Turning now to the drawings, FIG. 1 illustrates an extraction system 10 for extracting airborne components, such as smoke, fumes, particulate matter, and more generally, workspace air as indicated by reference numeral 12 from a work area 14. In the illustrated embodiment the extraction system 10 comprises a base unit 16 coupled to conduits 18 that channel air to and from a hood 20. The hood 20 is designed to be placed at or near (e.g., above) the work area 14 and, when the base unit 16 is activated, serves to create region of air around the area and to extract the workspace air, directing extracted air 12 to the base unit 16 for processing.

It should be noted that while in certain embodiments described in the present disclosure a stand-alone base unit 16 or cart-type unit is described, the present disclosure is not limited to any particular physical configuration. More generally, systems and arrangements provided herein may be implemented as fixed or semi-fixed installations, such as those used in industrial, commercial, hobby, and other settings. That is, certain of the components of the base unit described herein may serve multiple workspaces, work cells, weld cells, work locations and areas, and so forth, by common conduits that direct positive-pressure air to and channel air and airborne components from one or more workspaces. Operator controls may be positioned at the work area and/or remotely from such workspaces to control operation of the system 10.

Depending on the application, airborne components evacuated from the work area 14 may be in an aerosol form, such as solid, liquid or gaseous phase particles that are suspended in air. Such airborne components may form smoke, fumes (including chemical fumes), or clouds of components generated by an operation performed in the area. In some applications, the airborne components may be at least temporarily airborne but not suspended in the air, such as in the case of larger particulates, such as droplets, mist (e.g., from oils, coolants, and so forth), dust (e.g., from drywall, grain, minerals, cements, or other dust sources), chips, debris, and so forth. The system 10 is configured to collect and extract any such airborne components. Similarly, reference is made in this disclosure to "air" or "airborne", although the fluid in which the airborne components are found and that is circulated by the system may be, more generally, a gaseous substance that need not contain the same constituents, or in the same ratios as found in atmospheric air. Such gasses are intended nevertheless be included in the term "air" or "airborne". Moreover, it is presently contemplated that the same principles of fluid dynamics and borne component removal may be applied to other "fluids" than air or gasses (including liquids), and to that extent the teachings of the present disclosure are intended to extend to those applications.

In some examples, the base unit 16 includes a blower 22 driven by a drive motor 24. The drive motor 24 (as well as other functions of the extraction system 10) is controlled by control circuitry 26 which may provide drive signals to the motor for fixed-speed or variable-speed operation. The cart may best be designed with a small and highly efficient drive motor on the blower. In some examples, more than one motor and/or blower, fan or compressor may be used. The motor or motors may operate on a fixed speed or variable speeds. The base unit 16 may be designed to draw power from any source, such as the power grid, battery sources, engine-generator sets, and so forth. The control circuitry 26 typically includes processing circuitry and memory for carrying out drive operations as desired by the operator or in response to system inputs as described below. Accordingly, the control circuitry 26 may communicate with an operator interface for receiving operator settings, speed settings, on-off commands, and so forth. Similarly, the control circuitry 26 may include and/or communicate with an interface (e.g., a remote interface) designed to receive signals from remote inputs, remote systems, and so forth. The control circuitry 26, via a remote interface, may also provide data to such remote systems such as sensors for monitoring and/or controlling operation of the extraction system 10.

As shown in FIG. 1, the conduits 18 extend between the base unit 16 and the hood 20, which may include a positive pressure air conduit and/or a return air conduit. In some examples, the positive pressure air conduit provides air to the hood, while the return air conduit is under a negative or slight suction pressure to draw air containing the airborne components from the work area 14. The extracted air 12 returning from the hood 20 in conduit 18 may be directed through a filter 38. In some examples, the air 12 may be re-introduced into the blower 22 as a semi-controlled system. As described herein, the system may also include components designed to allow for adjustment of the individual or relative flow rates of one or both of the positive and negative pressure air streams.

In some examples, adjustment of the positive pressure air flow and/or the return air flow may be optimized for specific operations of the system. Several different techniques are presently contemplated for such adjustment and may include, for example, a bypass valve, a louver, or other mechanical device which may be adjusted to limit the flow of air from the suction filter and, consequently, the intake of air into the blower 22 from the ambient surroundings. Such adjustment may advantageously allow for relative mass or volumetric flow rates of the positive pressure and return airstreams to enhance creation of the air region and extraction of workspace air 204. For example, user inputs may be provided via an operator interface to control one or both adjustments, communicated to the control circuitry 26 to regulate their operation (e.g., via small adjustment motors and/or actuator assemblies). In some examples, adjustments to flow rates for the positive and negative pressure airstreams may be made by altering the speed of one or more motors and/or blowers, fans or compressors. Moreover, other and additional components and functionalities may be built into the system.

As shown in the illustration of FIG. 1, adjustments to the extraction system 10 may alter an amount of workspace air drawn into the extraction system 10. For example, a smaller region 202 represents an approximate limit for the effective capture and extraction of airborne components at a first extraction setting, while a larger region 204 represents a much greater effective capture and extraction region at a second extraction setting. While the effectiveness of the extraction will depend upon factors such as particle size, temperature, flow rate, etc., the graphic illustration of FIG. 1 provides a demonstration of adjustable extraction capabilities.

In the illustration of FIG. 1, the example system 10 is housed in a cart 40 designed to be rolled on wheels or casters 43 to the vicinity of a metal working operation. The system 10 can be designed to be plugged into a conventional outlet, such as to draw power from the power grid. In some examples, the conduits 18 include flexible joints, allowing raising, lowering, lateral and other positioning of the hood 20 at or near, typically above, the work space 14. In some examples, an arrangement of conduits may make use of a manifold to aide in distributing positive pressure air flow to the annular space between the inner and outer shrouds of the hood.

As mentioned above, the present techniques may be employed in systems and arrangements other than carts or systems and base units that are local to a work location. In some examples, fixed or semi-fixed extraction systems may be employed in workshops, factories, assembly and metal-working plants, and so forth.

The conduits 18 convey both a positive pressure or outgoing flow and a return flow that may contain airborne components to be extracted from the work area. In this example, the conduits 18 are adapted for rotation at one or more interfaces. The conduits 18 may rotate more or less than 360 degrees at each interface, although full multi-rotation capabilities may be designed into one or more joints between the conduits 18, the hood 20, and/or the base unit 16. In the embodiment of FIG. 1, the conduit 18 has a lower joint 42 where it joins the base unit, a middle joint 44 that joins two generally linear sections of conduit and a hood joint 46 about which the hood 20 may be pivoted at least within a limited angular range. One or more support structures 48 are provided adjacent to the lower joint 42 or joint 44 to aid in supporting the arm as it is extended toward and/or retracted from a work area. In the example system 10 of FIG. 1, the joints may include smooth inner walls that can be deformed so as to permit extension, retraction and, more generally, positioning of the conduits 18 with respect to the base unit 16, while adding little or no head loss as compared to a linear section of conduit.

As shown in FIG. 1, the base unit 16 has a filter 38 disposed in a filter enclosure or filter box 36. The filter enclosure 36 defines a region around or adjacent to the filter 38 from which air is drawn during operation of the system 10. That is, as disclosed herein, the returning or negative airstream enters the base unit 16, and this airstream, bearing the airborne components (e.g., debris, particles, etc.) enters into the region and then through an outer periphery of the filter 38. In some examples, the filter medium is cylinder-like, but any suitable configuration may be used. In some examples, the filter 38 is hollow, and is closed by a cap. Because debris may be released from the filter element during cleaning, the collection tray 28 is placed near a bottom region of the base unit 16 to allow the debris to be collected and/or separated from the filter element.

Within the cart, return flow air 12 enters a filter enclosure 36 containing a filter 38, where the air 12 is filtered to remove particulate matter and other components borne by the airstream. The assembly may be designed for pressure cleaning, in a process that may direct pressurized air against one or more filter elements to promote the release of the captured particulate. From the filter enclosure 36, air is drawn into the blower 22 which is driven by motor 24 as described above. In some examples, multiple motors and/or blowers may be employed. For example, one motor and blower set may be used for the outgoing or positive air stream, while another motor and blower set may be used for the return or negative air stream. One or both air streams may be filtered by a common filter or dedicated filters.

The system 10 may be equipped for filtering of components and debris from the air stream 12 returning to the base unit 16. For example, this debris may collect in one or more filters, filter media, and/or filter elements 38 and/or the filter enclosure 36. Moreover, the collected debris may be cleared or cleaned from the filter elements 38, such as by application of pressurized air (or other fluid), typically in pulses or puffs against the filter medium, as disclosed herein.

In a location over which the filter 38 would be placed are nozzle(s) or diffuser(s) 34, which may provide streams, pulses, puffs, and/or other flow of air, gas, and/or other fluids to clean the filter media 38. As shown in FIG. 1, the nozzle 34 is coupled to a supply conduit 32, which is used to convey compressed air from an air compressor 30 to provide the puffs of forced air to the nozzle 34. A collection tray or baffle 28, which may be removable, can be provided below the filter area to capture and/or provide disposal of debris from the environment.

For example, the nozzles 34 direct the forced air against the interior surface of the filter 38 during a cleaning sequence, thereby releasing debris from a filter wall. During this cleaning sequence the unit is typically not in operation to draw air 12 from the workspace 14. Thus, the loosened debris may fall within the filter enclosure 36. A baffle may be arranged as a plate within or below the filter enclosure 36 through which the debris may fall (e.g., onto collection tray 28). The collection tray 28 may include one or more baffles to provide separation of the debris from the low pressure that will be present immediately around the filter element 38 when operation of the base unit 16 resumes. From time to time, the debris may be cleaned from the unit 16 by collection tray 28.

Figure 2:
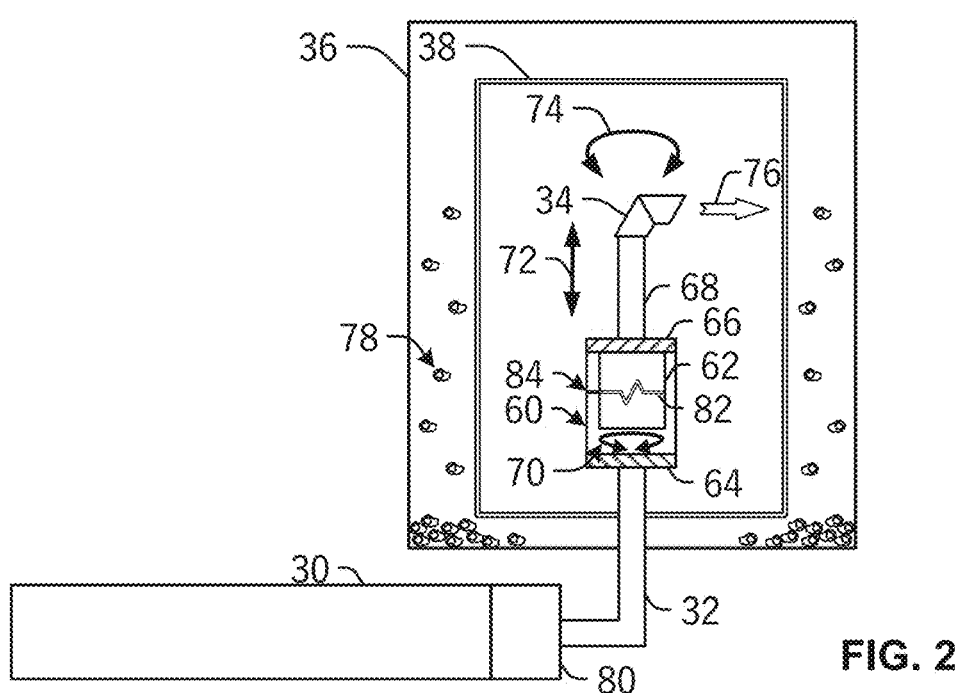
FIG. 2 is a diagram illustrating an example pneumatic cleaning system, in accordance with aspects of this disclosure.

Turning now to FIG. 2, an example pneumatic filter cleaning device for an airborne extractor system is provided. As shown, a valve or other regulating device 80 may be arranged between the air compressor 30 and the conduit 32, which is in turn coupled to a chamber or housing 60. In some examples, the valve 80 is manually, mechanically, and/or electronically controlled to initiate a pneumatic filter cleaning operation (e.g., in response to a sensor data, a control command, a change in pressure, and/or reaching a threshold pressure level). The chamber 60 encloses a movable guide 62 (e.g., extension guide), which is coupled to a second end of a conduit 68 supporting the nozzle 34 at a first end.

During a cleaning operation, pressure at the nozzle 34 increases, forcing the nozzle 34 to extend away from the chamber 60. When a pressure at the nozzle reaches a threshold pressure level (e.g., an adjustable or tunable pressure level), a pulse of air 76 is released. As provided herein, the pulse of air 76 is directed toward a wall of the filter 38, forcing debris or other contaminants 78 to dislodge from the filter media. In some examples, the debris may collect within the filter 38. In some examples, the debris 78 may collect in a different portion of the system 10 (e.g., the collection tray 28) for removal.

As the pressure at the nozzle 34 changes, the nozzle 34 is forced to move along an axis shared with chamber 60, as shown by arrow 72. This movement similarly forces the guide 62 to move in the direction of arrow 72. In some examples, a groove or channel 82 may be formed or otherwise integrated with the guide 62, and paired with a follower 82 secured to an opposing surface of the chamber 60, providing a cam and follower mechanism.

The groove 82 is configured to guide rotation of the guide 62, as shown by arrows 70, in response to linear movement 72 of the nozzle 34 and the guide. Due to the coupled relationship between the guide and the nozzle 34, the nozzle 34 experiences both linear (72) and rotational (74) movement, thus directing the pulsed air 74 at various locations of the filter 38.

In some examples, the nozzle 34 and the guide 62 move to a first position (e.g., full extension from the chamber 60) as pressure at the nozzle 34 increases. Once the pressure reaches a threshold pressure level (e.g., determined by a valve at the nozzle), the pulsed air 74 is released, causing the pressure at the nozzle 34 to decrease, often rapidly. As a result, the nozzle 34 and the guide 62 change from the first position to a second position at or proximate to the chamber 60.

In some examples, a spring or other mechanism 62 is employed to bias the nozzle 34 toward the second position. Additionally or alternatively, one or more bumpers 64 and 66 can be included (e.g., within the chamber 60), which can limit or arrest movement of the guide 62.

For example, the groove 82 can be configured to control linear or rotational movement of the nozzle 34 and/or the guide 62 at variable rates and/or over variable positions, as is suitable for a particular application. In particular, following the groove 82 may force extension of the guide 62 to the first position at a first rate of movement (e.g., linearly or rotationally) in response to an increase in pressure at the nozzle. In response to release of the pulse of air 76, the groove 82 may force retraction of the guide 62 to the second position at a second rate, greater rate to force a shock or rapid impact, which may dislodge debris 78 from the filter 38. In some examples, the nozzle 34 and/or the chamber 60 are offset from a center of the filter 38 and/or filter enclosure 36.

In some examples, the chamber 60 of the pneumatic filter cleaning device is configured to receive pressurized air and release a pulse of air when a pressure at the chamber 60 (or the nozzle 34) reaches a threshold pressure level. The chamber 60 is coupled to a second end of the conduit 68, which releases the pressurized air to the nozzle 34.

In some examples, the guide 62 is a bushing configured to slow or interrupt rotation of the nozzle 34 as the pulsed air drives the nozzle 34. For instance, the nozzle 34 may be directed at one or more angles relative to the surface of the filter 38. As the pulse of air forces rotational movement of the nozzle 34, the bushing (which may support the conduit 68 and/or the chamber 60) may be configured to regulate rotation of the nozzle. In this manner, the bushing may create friction between mated surfaces (of the bushing/guide 62, the chamber 60, and/or conduit 68), and/or may have a surface designed to regulate movement (e.g., a saw tooth pattern, an uneven surface, different materials with different friction coefficients, etc.).

Figure 3A:
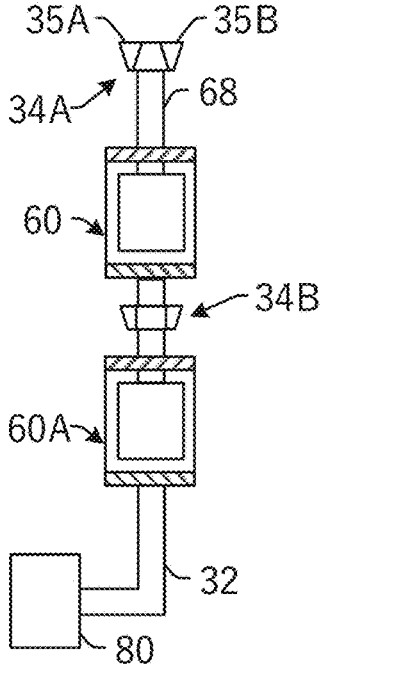
FIGS. 3A and 3B are diagrammatical representations of example pneumatic cleaning systems, in accordance with aspects of this disclosure.
Figure 3B:
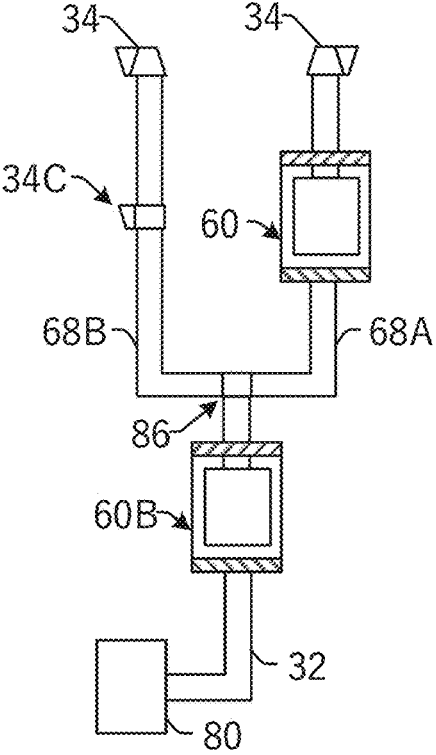

FIGS. 3A and 3B illustrate additional or alternative devices or techniques that may be employed in accordance with the present disclosure. As shown in FIG. 3A, multiple nozzles, guides, and/or extension guides may be employed to amplify the effects of a pneumatic filter cleaning operation. For example, the nozzle 34A may include multiple nozzle outlets 35A and 35B, each configured for linear and/or rotational movement as disclosed with respect to FIG. 2. Further, another nozzle 34B may be arranged at any portion of conduit or extension member of the device. As shown in FIG. 3A, nozzle 34B is arranged between two chambers 60 and 60A, however, additional or alternative nozzles may be arranged at any location, in any number, and in any configuration while maintaining the spirit of this disclosure. Further, chambers 60 and 60A may be identical or may alter one or more physical or operational characteristics (e.g., in size, shape, guided movement, rate of movement, etc.). Further, although two chambers are illustrated, chambers may be provided at any location, in any number, and in any configuration while maintaining the spirit of this disclosure.

FIG. 3B illustrates an example pneumatic filter cleaning device providing a primary chamber 60B, which supports two conduits 68A and 68B, fed by a coupler, valve or regulator 86. In this example, each conduit 68A and 68B will be subject to linear and/or rotational movement responding to changes in pressure at the coupler 86 and/or the nozzles 34 or 34C. As shown, the conduit 68A employs another chamber 60. Further, conduit 68B provides an additional nozzle 34C. However, in some examples, each conduit extending from coupler 86 is identical. In some examples, chambers and/or nozzles may be provided at any location, in any number, and in any configuration of the various conduits while maintaining the spirit of this disclosure.

Figure 4:
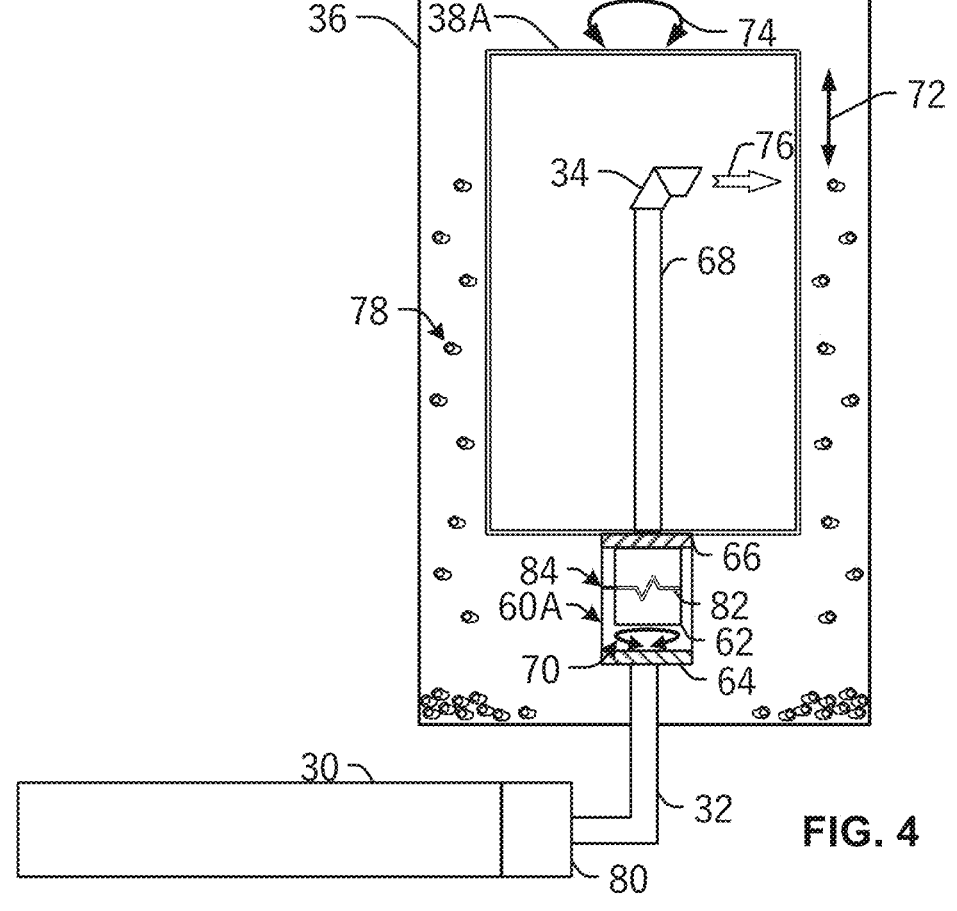
FIG. 4 is a diagram illustrating another example pneumatic cleaning system, in accordance with aspects of this disclosure.

Turning now to FIG. 4, another example pneumatic filter cleaning device for an airborne extractor system is provided. As shown, a chamber 60A (similar to chamber 60) is arranged between a base wall of the filter enclosure 36 and a movable filter 38A. In particular, the chamber 60A is configured to move responsive to changes in pressure (e.g., as the pressure changes at that nozzle 34, within the chamber 60A, etc.). The movement of the chamber 60A creates corresponding movement of the filter 38A in one or both of vertical direction 72 and/or rotational direction 74. In some examples, the nozzle 34 and/or conduit 68 are not moved in response to movement of the chamber 60A.

In some examples, the movable guide 62 is coupled to the second end of conduit 68 supporting the nozzle 34 at the first end, and moves responsive to pressure at the nozzle 34 (as disclosed herein). In some examples, the chamber 60A is secured to the filter 38A (e.g., via a mount, fixture or fastener), such that movement of the chamber 60A moves the filter 38A as described.

During a cleaning operation, pressure increases, forcing the filter 38A to extend away from the base of the filter enclosure 36. When a pressure (e.g., at the chamber 60A, at the nozzle 34, etc.) reaches a threshold pressure level (e.g., an adjustable or tunable pressure level), the filter 38A moves as described. In some examples, the nozzle 34 and/or the chamber 60A are offset from a center of the filter 38A and/or filter enclosure 36. In some examples, operation of a pneumatic filter cleaning device is controlled at least in part by a valve configured to convey pressurized air into the filter cleaning device in response to a control signal from control circuitry (e.g., control circuitry 22). For example, the control circuitry may be configured to monitor one or more operating conditions of the filter media, such as a static pressure, a change in pressure, an air flow rate, a change in air flow rate, a charge, an amount of detritus collected at the filter element, or a time of filter use, as a non-limiting listing of conditions.

Based on sensor or other data, the control circuitry may determine a value of the one or more operating conditions and compare the value to a list of threshold operating condition values. If the operating condition value exceeds a first or given threshold operating condition value (e.g., provided in a listing of threshold operating condition values, such as stored in a memory associated with the control circuitry 22), the control circuitry is configured to control the valve to open to convey pressurized air to initiate a cleaning operation.

Figure 5:
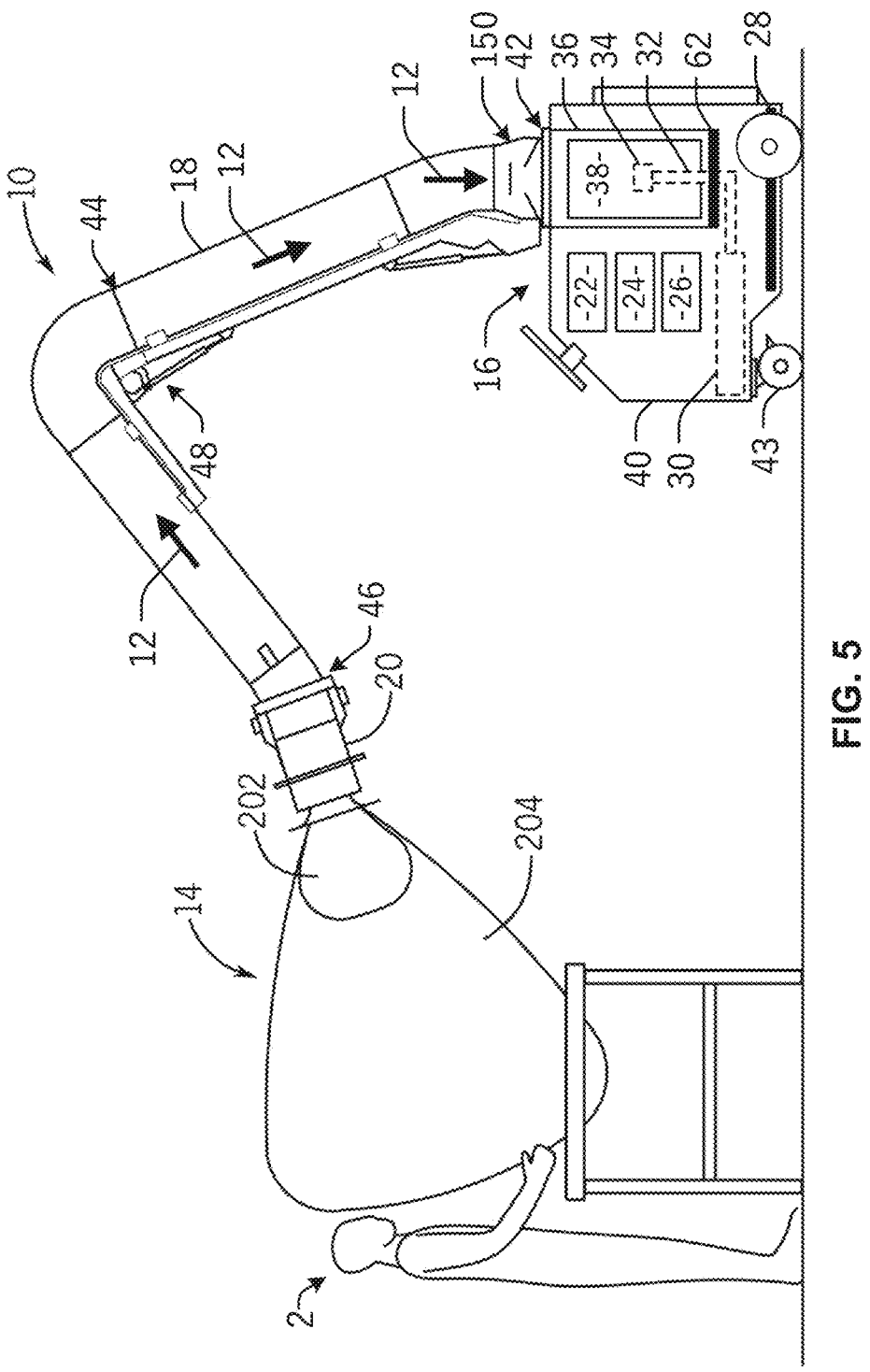
FIG. 5 illustrates an example fume extractor that includes a cooling system and a filter removal system, in accordance with aspects of this disclosure.
Figure 6:
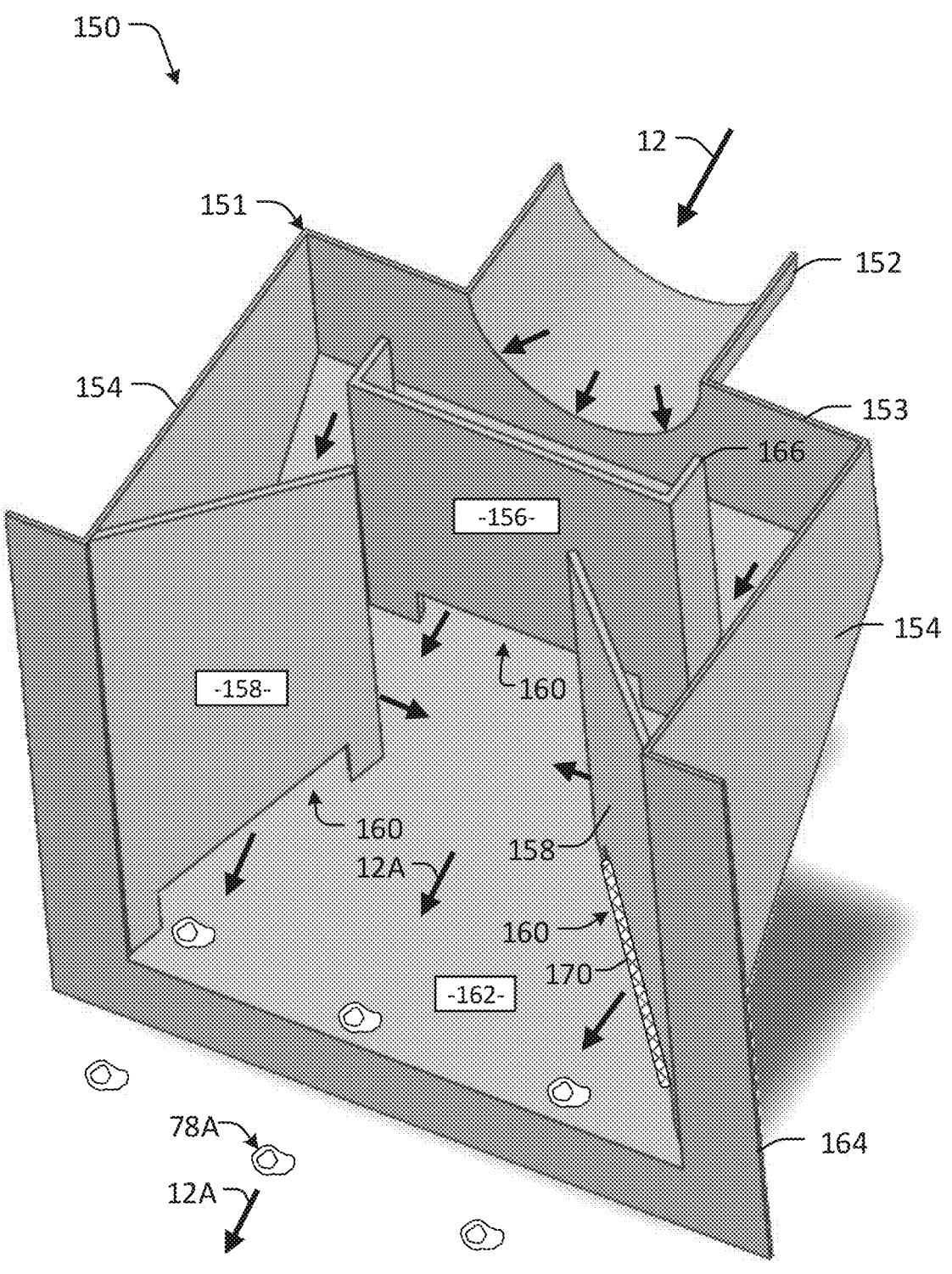
FIG. 6 provides a cross-sectional view of the cooling system of FIG. 5, in accordance with aspects of this disclosure.

Turning to FIGS. 5 and 6, a cooling system 150 for cooling sparks that may collect in debris and/or be introduced into an extraction system 10. As shown in FIG. 5, the cooling system 150 is arranged upstream of the filter 38 (and may be arranged upstream of the filter enclosure 36). The cooling system 150 may include one or more conduits and/or manifolds, which may be provide support through which the conduit 18 is attached to the housing 40. Air 12 is drawn into the conduit 18 from the work area and is slowed upon reaching the cooling system 150 prior to exposure to the filter 38. For example, the cooling system 150 provides a tortuous path through which air and/or debris flows, thereby increasing the time and/or distance debris (including heated and/or sparking particulate matter) travels to reach the filter 38.

FIG. 6 provides a cross-sectional view of the cooling system 150. As shown, an inlet or conduit 152 allows air 12 to enter the housing or manifold 151. The manifold 151 includes one or more top walls 153, side walls 154 or 162, and/or bottom plates 164. In some examples, the conduit 152 is configures to mate with conduit 18, thereby creating a substantially airtight path for air 12. The bottom plate 164 may include one or more fasteners or other mounting equipment for securing the cooling system 150 to the housing 40, or may be welding to the housing. Although illustrated as having a substantially rectangular geometry, the manifold 151 and/or any constituent part may include any type and/or types of geometry. For example, the manifold 151 may be circular, triangular, oval, as a list of non-limiting examples, and the constituent parts may conform to the manifold geometry.

As shown, one or more perpendicular plates 156 is arranged within the manifold 151 to meet the airflow from conduit 152. Having met resistance from the perpendicular plate 156, the air 12 is diverted to the internal surface of the walls, etc., of the manifold 151, and/or through one or more slots 160 (which allows for some particulate matter to fall through). As the air 12 flows toward the base plate 164, in some examples, it will meet a surface of one or more secondary plates 158, further slowing the flow of the air. As shown, the secondary plates 158 are orientated at an angle relative to the direction of airflow through the manifold 151 (e.g., approximately 45 degrees, and/or less or more than 45 degrees).

In some examples, the secondary plates 158 include additional slots 160, whereas in other examples the secondary plates 158 and/or the perpendicular plate(s) 156 do not include slots 160. In some examples, the slots 160 are openings formed, cut, drilled, or otherwise created in the plates 156, 158. In some examples, a grate or other filter 170 is arranged at, near, or with one or more of the slots 160. The filter 170 may be removable and/or have a different opening size and/or material composition (e.g., metal, ceramic, etc.) to suit a particular application.

Together the plates 156, 158 and/or slots 160 create a tortuous path for the flow of air to yield cooled air 12A and/or cooled particulate debris 78A. As the manifold 151 of the cooling system 150 is angled downward, shown in the example of FIG. 6, and the plates have slots, particulate matter that collects is allowed to fall and slide into the enclosure 36, to be removed by one or more of the disposal techniques disclosed herein, including removal by way of tray 62. In this way, the cooling system 150 is self-cleaning.

Although illustrated with a relative size, shape, and/or arrangement, the plates may be modified to create and/or divert one or more tortuous paths that vary in size and flow pattern. The system may be scaled for different ducting sizes (e.g., larger or smaller systems, high or low pressure, etc.). Further, although three plates are shown in FIG. 6, additional plates may be employed to further increase the spark cooling effect and further frustrate the flow or air.

The disclosed cooling system 150 provides advantages over other systems. For example, the perpendicular plate 152 and/or secondary plates 154 allow for collected debris to fall into the enclosure 36 for removal without requiring access to the manifold interior and/or removal of the system. Further, in the example of FIG. 6, the manifold 151 is arranged above the enclosure 36, thereby allowing cooled and collected debris 78A to fall naturally into the enclosure 36. In some examples, the system is arranged to a side or at an angle to the enclosure 36, depending on variations on different applications.

In some examples, original equipment or even retrofits for the disclosed pneumatic filter cleaning device may be made to equipment such as shop vacuum systems, existing evacuation installations, and so forth. It is also contemplated that structures and teachings based on those set forth herein may be employed in specific settings to provide enhanced airborne component collection.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A pneumatic filter cleaning device for an airborne extractor system comprising:
a nozzle secured to a first end of a conduit; and a chamber enclosing a movable guide that is coupled to a second end of the conduit, wherein the nozzle is configured to release a pulse of air when a pressure at the chamber or the nozzle reaches a threshold pressure level, and wherein the movable guide comprises a cam having a groove paired with a follower secured to an opposing surface of the chamber, wherein the device is configured such that an increase in the pressure at the nozzle causes the cam to rotate a first amount relative to the follower, forcing the nozzle into a first position relative to the chamber, and wherein the device is configured such that release of the pulse of air changes the pressure to below the threshold pressure level, which then causes the cam to rotate a second amount relative to the follower, forcing the nozzle to a second position relative to the chamber.

2. The device of claim 1, wherein the first position corresponds to a first distance of the nozzle extending from the chamber.

3. The device of claim 2, wherein the second position corresponds to a second distance of the nozzle from the chamber following release of the pulse of air, the second distance being less than the first distance.

4. The device of claim 1, wherein the groove is configured to guide rotation of the movable guide as a change in pressure at the nozzle forces the nozzle to move from the first position to the second position, movement of the nozzle causing movement of the movable guide.

5. The device of claim 1, wherein the cam is configured to force extension of the conduit to the first position at a first rate of movement in response to the increase in pressure at the nozzle without the use of a spring, and to force retraction of the conduit to the second position at a second rate of movement greater than the first rate in response to the pulse of air.

6. The device of claim 1, further comprising a spring configured to bias the nozzle toward the second position.

7. The device of claim 1, further comprising a bumper within the chamber configured to limit movement of the conduit.

8. The device of claim 1, wherein pressurized air is provided by an air compressor connected to the chamber.

9. The device of claim 8, wherein conveyance of the pressurized air from the air compressor is regulated by a valve.

10. The device of claim 1, wherein the nozzle is oriented toward a surface of a filter element.

11. The device of claim 1, wherein the nozzle is a first nozzle arranged at a first position on the conduit, the device further comprising a second nozzle arranged at a second position on the conduit.

12. A pneumatic filter cleaning device for an airborne extractor system comprising:

a nozzle secured to a first end of a conduit;

a chamber enclosing a movable guide that is coupled to a second end of the conduit, wherein the nozzle is configured to release a pulse of air when a pressure at the nozzle reaches a threshold pressure level, wherein the conduit is configured to be forced to extend to a first position in response to an increase in pressure at the nozzle without the use of a spring, and wherein the conduit is configured to be forced to retract to a second position in response to release of the pulse of air without the use of a spring; and a valve configured to convey pressurized air into the filter cleaning device in response to a control signal from control circuitry, wherein the conduit is configured such that a change in pressure at the chamber or the nozzle forces the nozzle to release the pulse of air thereby rotating the nozzle as the conduit moves from the first position to the second position, and wherein the movable guide is configured to regulate rotation of the nozzle.

13. The device of claim 12, wherein the control circuitry is configured to:

receive sensor data from one or more sensors;

monitor one or more operating conditions of a filter media;

determine a value of the one or more operating conditions;

compare the value to a list of threshold operating condition values; and control the valve to open to convey pressurized air in response to the value exceeding a first threshold operating condition value of the list of threshold operating condition values.

14. The device of claim 13, wherein the control circuitry is configured to generate an alert in response to the value exceeding a second threshold operating condition value of the list of threshold operating condition values.

15. The device of claim 13, wherein the one or more operating conditions comprises a static pressure, a change in pressure, an air flow rate, a change in air flow rate, a charge, an amount of detritus collected at the filter element, or a time of filter use.

16. A pneumatic filter cleaning device for an airborne extractor system comprising:

a nozzle secured to a first end of a conduit;

a chamber configured to receive pressurized air and is coupled to a second end of the conduit, wherein the nozzle is configured to release a pulse of air when a pressure at the chamber or the nozzle reaches a threshold pressure level, wherein the conduit is configured to be is forced to extend to a first position in response to an increase in pressure at the nozzle without the use of a spring, and wherein the conduit is configured to be forced to retract to a second position in response to release of the pulse of air without the use of a spring; and a movable guide configured to regulate rotation of the nozzle, wherein the conduit is configured such that a change in pressure at the chamber or the nozzle forces the nozzle to release the pulse of air thereby rotating the nozzle as the conduit moves from the first position to the second position.

17. The device of claim 16, wherein the movable guide is a bushing configured to slow or interrupt rotation of the nozzle as the conduit moves from the first position to the second position.

* * * * *